United States Patent
Betts-Lacroix

(10) Patent No.: US 10,136,612 B1
(45) Date of Patent: Nov. 27, 2018

(54) STERILE MODULAR FACILITY

(71) Applicant: Vium, Inc, San Mateo, CA (US)

(72) Inventor: Jonathan Betts-Lacroix, Menlo Park, CA (US)

(73) Assignee: Vium, Inc., San Mateo, CA (US)

( * ) Notice: Subject to any disclaimer, the term of this patent is extended or adjusted under 35 U.S.C. 154(b) by 239 days.

(21) Appl. No.: 15/195,956

(22) Filed: Jun. 28, 2016

(51) Int. Cl.
*A01K 1/00* (2006.01)
*B65G 1/04* (2006.01)
*A01K 1/03* (2006.01)

(52) U.S. Cl.
CPC .......... *A01K 1/0035* (2013.01); *A01K 1/0047* (2013.01); *A01K 1/031* (2013.01); *B65G 1/04* (2013.01)

(58) Field of Classification Search
CPC .............................. A01K 1/0035; A01K 1/0047
USPC ........................................................ 454/187
See application file for complete search history.

(56) References Cited

U.S. PATENT DOCUMENTS

| | | | |
|---|---|---|---|
| 2011/0053486 A1* | 3/2011 | Holtz | C12M 37/00 454/187 |
| 2013/0109291 A1 | 5/2013 | Holtz | |
| 2016/0010883 A1 | 1/2016 | Jornitz | |
| 2016/0010884 A1 | 1/2016 | Holtz | |

OTHER PUBLICATIONS

Art's Way Scientific Web Site; "www.artsway-scientific.com/vivariums" retrieved Sep. 5, 2018; p. 1 of 2; copyright 2018.
Art's Way Scientific Web Site; "www.artsway-scientific.com/vivariums" retrieved Sep. 5, 2018; p. 2 of 2; copyright 2018.

\* cited by examiner

*Primary Examiner* — Monica L Williams
(74) *Attorney, Agent, or Firm* — Kim Rubin

(57) ABSTRACT

A modular vivarium is constructed entirely from transportable, sterile modules of distinct types, called pods. A hallway pod forms a spine, with cage-rack pods, ingress/egress pods and optional VHACPIT pods providing HVAC, power and IT services connected as spur pods to the hallway. Supplies and waste are also within modular pods. Temporary or single-use seals cover doorways during transit. Modules are joined or removed while maintaining sterility on both sides of the flush-to-wall doorway junction. Supply and return air for all pods is through hallway based ducting. Pods may be constructed from ISO intermodal containers. Embodiments have no permanent buildings. Pods may be moved, leveled and aligned for joining via special supports. Cage-rack pods are configured with two cage racks and a single isle permitting robotic cage placement and retrieval. Embodiments provide vibration, noise and earthquake isolation.

22 Claims, 5 Drawing Sheets

STERILE MODULAR FACILITY

BACKGROUND OF THE INVENTION

Vivariums house a number of animals, typically test animals, such as rats or mice, in a number of cages, often a large number. Vivariums are expensive and time consuming to build. Sterility and a well-controlled environment require expensive, specialized systems, including those to manage airflow, temperature, and the ingress and egress of personnel and equipment. Typically, it is not possible to expand an operating vivarium or perform major maintenance on a vivarium while it is operating. Prior art vivariums are not modular.

SUMMARY OF THE INVENTION

Embodiments of this invention create a vivarium by the interconnection of pre-made modular units, also called modules or pods. Pods may be constructed from standard shipping containers, also known as intermodal containers. We identify five pod types: A cage-rack pod; a hallway pod; an HVACPIT pod; in ingress pod; and an egress pod. Other pod types may be used. HVACPIT stands for "heating, ventilation, air-conditioning, power, and information technology," although not all five functions are necessary in such a pod. In an exemplary core arrangement, a central hallway bod serves as a spine with multiple cage-rack pods connected as spurs. Two or more HVACPIT pods are also connected as spurs, or they are part of a different embodiment and are connected conventionally, such as via ducting and cabling. Ideally, redundant HVACPIT services to the entire vivarium by simply using two HVACPIT pods. At the two ends of the hallway an ingress and egress pod are connected respectively in a "T" formation. Alternatively, a single spur pod might provide both ingress and egress functions, as well as, optionally, storage, waste, and a procedure space. Connecting additional hallway pods end-to-end may extend the hallway spine. Numerous other arrangements of pods are possible. An alternative to standard shipping containers is another type of standardized, transportable container, such as railroad boxcars.

The benefit and typical use of the modular vivarium is rapid construction, expansion or reduction in size, major maintenance and re-configuration of a vivarium, including movement and re-use of pods at other locations. A key benefit over prior art is that expansion or reduction in size, major maintenance and re-configuration may be performed on an operating vivarium. In a typical application, no services from a site are required other than a stable pad or soil and basic electricity. Because the standardized pods and combined pod configurations have necessary regulatory approvals, construction and re-configuration on a specific site is speeded up by not requiring a separate regulatory approval process for each site.

An additional benefit is that the specialized waste for the vivarium can be removed all at once by replacing a "waste" pod with a fresh pod. Waste and supplies may be in a single swappable pod, so that new supplies may be provided and waste removed in a single operation. This can significantly reduce the costs of waste disposal, supply delivery and reduce the chance or an undesirable leak into the environment of a waste element, including pathogens.

An additional benefit is that the specialized supplies, which are well known in advance, may be restocked and delivered in a single intermodal container delivery, by swapping a consumed supply pod with a fresh supply pod.

Pods, in a plan view, are typically rectangular with a major axis along its length. Thus, we may easily refer to sides and ends of a pod. However, these naming conventions do not restrict other pod shapes such as square, hexagonal or octagonal, or non-regular shapes.

The interconnection of pods requires specialized doorways. These doorways, if not connected to another pod, must be sealed to preserve a sterile environment interior to the pod. These doorways must be configured so that a new pod may be connected to an operating vivarium—doorway-to-doorway—without violating the sterile environment of either the vivarium or the new pod.

Typically, hallway pods have doorways on the sides to support spur connections to cage-rack pods and HVACPIT and doorways on the ends to support connections to ingress and egress pods and additional hallway pods. Spur pods typically have a doorway on one end to connect to the hallway spine and may have a second doorway on the other end to support connection to another spur pod. Ingress and egress pods typically have a doorway on each end to support movement of personnel at one end and equipment at the other end, plus a side doorway to connect to an end of the hallway spine. For pods with more than one doorway, not all doorways need to be used.

We note that configurations as described in embodiments are not esthetic or design choices but are critical to the effective implementation and use of embodiments. Such configurations of modular components are a dramatic departure from the prior art design of vivariums. As one example, long rows of cages in racks on along both interior walls of a cage-rack pod support efficient implementation of an automated cage placement and retrieval system. As another example, cage-rack pods as spurs to a hallway spine support efficient use and movement of procedure stations in the hallway proximal to the doorways to the cage-rack pods. Minimizing cage movement cage transfer time is a key benefit of embodiments over prior art. Minimizing the movement of personnel to maximize production throughput of operations is a key benefit of embodiments over prior art.

Pods may be constructed of 40' containers, 53' containers, ora mix. If mixed, high-cube 40' containers are preferred as then both lengths are 9' 6" high. 53' containers provide significant cost/cage advantage of 40' containers. A 40' hallway pod typically supports six spur pods. A 53' hallway pod typically supports eight spur pods.

DETAILED DESCRIPTION

For convenience, we identify the following pod types: (1) a holding pod, also called a cage-rack, rack, or animal pod, typically contains an array of animal cages along each inside long wall. For example, a 40' holding pod might have 6 to 8 rows with 15 to 45 columns of mouse cages on each wall. A 53' cage-rack pod holds proportionally more cages. Typically, each removable cage slides into a dedicated location for it the rack, which is permanently attached to the inside wall or floor of the pod. Racks are typically pre-wired with permanent intake air plenums, exhaust air plenums, and electrical and electronic wiring. (2) A hallway pod, also called a major axis pod, backbone pod, or distribution pod. This pod provides flow for personnel and provides HVAC and electrical distribution to the side pods. (3) Ingress, egress, or a combined ingress/egress pod. The distal end of this pod provides for personnel and optionally some equipment, supplies and animals to enter and leaver the vivarium. Typically it provides changing areas and air showers for personnel. Typically, it provides an airlock or sanitary transfer area of movement of supplies, waste, animals and equipment, although this is not a preferred access point for all such. (4) Equipment pod. This pod provides storage and working areas for equipment including optionally procedure and analysis stations. (5) Supplies pod. This pod provides fresh, clean sanitary supplies, such as animal food, animal litter, chemicals, medical supplies, and the like. (6) Waste pod. This pod, which is initially sterile when first connected to the modular vivarium, accumulates waste, such as used animal litter, biological waste, medical waste, and the like. (7) HVACPIT pods, which provide all or a subset of HVAC, Power, and IT services to the modular vivarium. Some pods may have functions described above combined.

The foregoing names and functions of pods are non-exclusive and non-limiting. Functions of pods may be combined into a single pod. For example, ingress and egress may be combined into one pod. Equipment and supplies may be combined into one pod. One typical arrangement is for all pods except the hallway pod to be connected at right angles, through specialized doorways, to the hallway pod. Pods may also be connected at the ends of the hallway pod. Pods connected at right angles to the hallway pod are called spur pods. The HVACPIT pods may be connected to the hallway pod. Or, in a preferred environment, the HVACPIT pods are not connective via doorways, but rather have air plenums and cables through which these pods provide these services to the rest of the modular vivarium. Typically, a pair of HVACPIT pods is used per vivarium to provide redundancy of all or some HVACPIT services.

Figure 1:
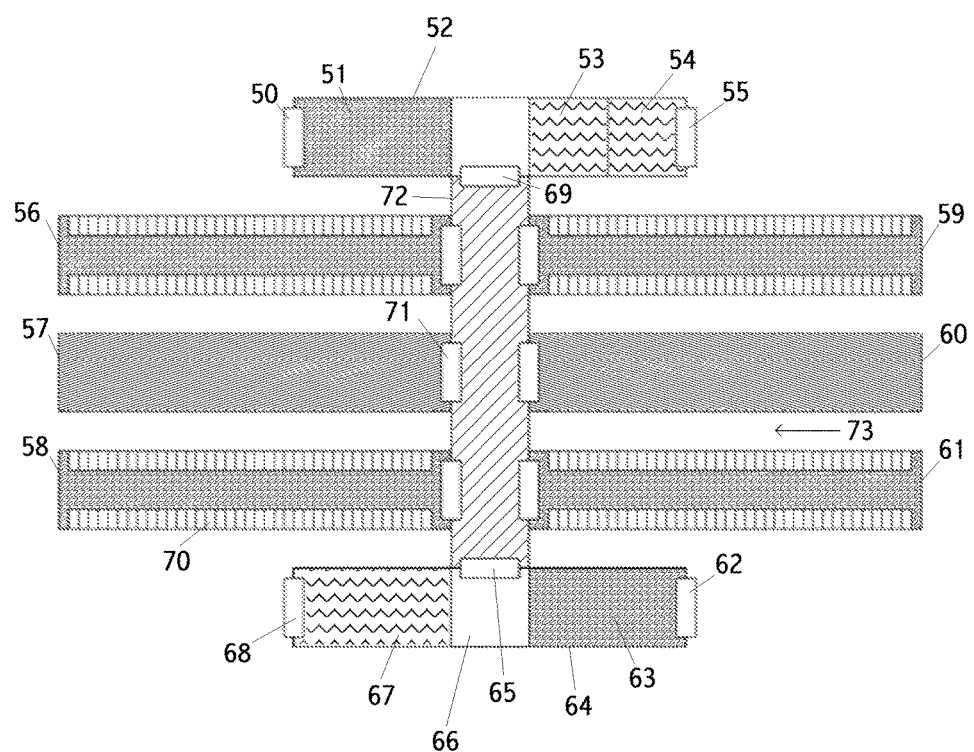
FIG. 1 shows an exemplary configuration of pods in a modular vivarium.

Turning now to FIG. 1, we see an exemplary configuration of pods in a modular vivarium. Nine pods in five pod types are shown. The spine or backbone of the configuration is one hallway pod 72. At one end of the hallway pod 72 is an ingress pod 52, connected to the hallway pod at doorway junction 69. At another end of the hallway pod 72 is an egress pod 64, connected to the hallway pod at doorway junction 65. Three spur pods are shown on each side of the hallway pod 72: four cage-rack pods 56, 58, 59 and 61; and two HVACPIT pods 57 and 60. These connect to the hallway pod at doorway junctions. One such doorway junction has reference designator 71: between HVACPIT pod 57 and the hallway pod.

In one embodiment, ingress pod 52 provides ingress of people at doorway 55, with a gown-in area 54 and an air shower area 53. Ingress pod 52 may have a supplies-in doorway 50 and a clean storage area 51. Both people and equipment from the ingress pod 52 may move into the hallway pod 72 through doorway junction 69.

In one embodiment, egress pod 64 provides for egress of people and waste at doorway 68, with a procedure and surgery suite 63 and equipment access at doorway 62. Area 67 may be used for de-gown and dirty storage. Doorway junction 65 is use for people exit and for two-way animal and equipment movement from and to the hallway pod 72 and staging area 66. Embodiments include the relative arrangement shown of any subset of these elements, or expansions as described elsewhere in this specification.

Cage-rack pods 56, 58, 59 and 61 may have animal cages in racks 70 where the racks are arranged in two rows along the interior sides of the pod, such as pod 58. Cages in racks may be accessed by an automated cage placement and retrieval device that operates down the corridor of the pod between the rows of cage racks. The automated cage placement and retrieval device may pick up and deliver animal cages at a doorway junction, such as 71 with the hallway pod 72.

A procedure station, not shown in the Figure, may be mobile within the hallway pod 72 and align with the spur pod doorway junctions, such as 71, and be configured to accept a cage from or deliver a cage to the automated cage placement and retrieval device.

The procedure station may mate with the doorway junction, such as 71, such that airflow from the spur pod, such as 57, through the procedure station, and also airflow from the hallway pod interior through the procedure station, and then both airflows exhaust through an exhaust port in the procedure station, such that gases and potential contaminants in the procedure station do not enter or contaminate the air of either the spur pod or the hallway pod.

An alternative embodiment comprises the following pods: (a) one hallway pod; (b) up to four or up to six holding pods; (c) one ingress/egress pod; (d) one equipment pod; (e) one supplies pod; (f) one waste pod; and (g) two HVACPIT pods. Pods (b) through (f) connect to the hallway pod as spurs. The two HVACPIT pods are configured redundantly and connect to the one of the hallway pod via supply air plenum(s), exhaust air plenum(s), and cables. In this configuration the interiors of the HVACPIT pods do not need to be sterile. Connecting additional hallway pods at the end of the hallway pod may expand this configuration.

Pods may be constructed from standard shipping containers, also known as intermodal freight containers. HVAC, power and IT components in the HVACPIT pods may be industry standard components, including residential grade components, rather that the expensive, specialized, high-reliability components of vivarium prior art. Cage-rack and other pods may have an interior treatment such as powder coating, plaster, or a sealed, sterile secondary wall, such as constructed from stainless steel panels with airtight connections between the panels. Some permanent components of pods, such as cage racks, may be installed prior to or after interior treatment. Some permanent components may receive interior treatment at the same time as the pod interior.

Access space 73 between spur pods may or not exist. That is, spur pods may be effectively adjacent to each other. Or, a gap 73 may be present, as shown in the Figure. Gap 73 may or may not be wide enough for service access.

Pods may be supported on adjustable feet or supports that may raise and lower the pod to align with other pods, and may level the pod. Pods may be supported on vibration, noise, shock or earthquake isolation feet or support. The feet or supports for raising, lower, and leveling may be the same feet or supports for vibration, noise, shock or earthquake isolation. Such supports may be inflatable. Additional such supports may be used for redundant support.

Noise isolation is desirable or required as many noises are foreign to the native environment of the vivarium animals, and so disturb them, and thus may compromise test results. The type of noises and vibrations to isolate and the level of noise isolation to isolate are determined specifically by the noises just so described. In particular, equipment noise and vibration, walking and thumps should be isolated.

Due to the automated nature of vivariums of this invention, there is minimal human activity in the animal cage pods. Prior art vivariums have a great deal of human activity and thus cannot isolate from such noises, and thus have minimal need for any or any additional noise isolation. A benefit of such noise isolation in embodiments herein is the creation and maintenance of more natural, lower-stress environments for the animals, thus creating higher quality study results.

Pods may be moved into position and aligned using X-Y movable shuttles, whereby shuttle we mean any piece of transport equipment so adapted, whether controlled manual or automatically, and whether powered or unpowered.

Variations from FIG. 1 for claimed embodiments include four stub pods connected to one hallway pod, with no pods at right angles, such as a "T" formation at the ends of the hallway pod.

Variations from FIG. 1 for claimed embodiments include HVACPIT pods providing supply and return air services to the hallway pod via external ducting. In one embodiment a HEPA filter is attached to the hallway pod, receiving supply air at the end of external ducting from one or two or more HVACPIT pods. HVACPIT pods may not necessarily be connected to the hallway pod via human-accessible doorways.

Embodiments include ceiling and floor air ducts implemented by a false ceiling, false floor, or both. Embodiments include doorways whose base is at the level of a false floor such that the floors of the adjoining pods and the base of the doorway are free of a threshold. This avoids tripping by personnel and permits carts and equipment to be rolled through the doorway. Embodiments include supply air and return air connections, gasketed similarly to the doorways, located in the ceiling duct area and floor duct areas between two connected pods such that air may move from connected pods without reducing the height of the doorway. Suitable height for the floor and ceiling ducts is 8". Suitable size for inter-pod gasketed air opening is 6" high by 18" wide. Supply air may be in the ceiling and return air may be in the floor.

Figure 2:
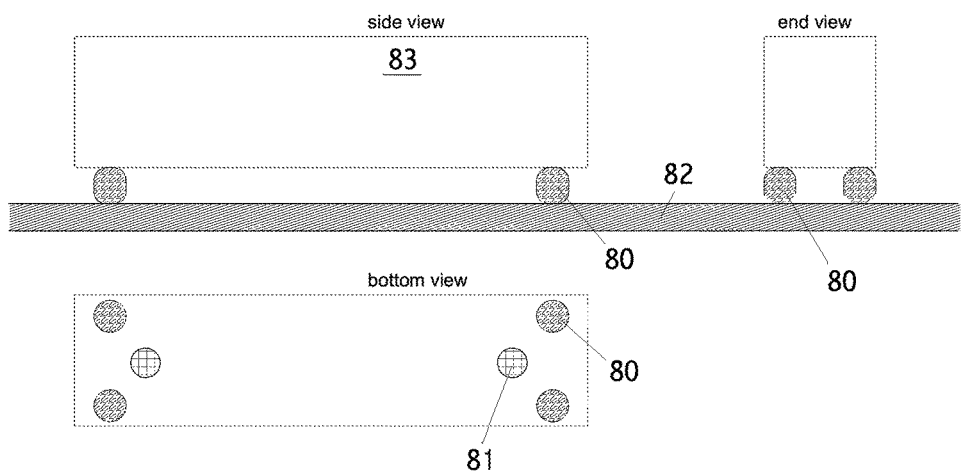
FIG. 2 shows three views of pod on adjustable supports.

Looking now at FIG. 2, we see three views of a pod 83 supported by adjustable feet or supports, hereinafter called supports. Supports may be paired into a support assembly, not shown. Typically, a minimum of four supports is used, with exemplary supports labeled as 80. The supports support the pod 83 on a suitable base, such as concrete, compacted soil, gravel, or other suitable base, shown as 82. In some embodiments additional supports are use redundantly. Two such optional redundant supports are shown in the bottom view as 81. These redundant supports are not shown in the side and end views. In some embodiments supports 80 are inflatable. Such supports may fail: thus the value of redundant supports 81. Redundant supports 81 may not be the same type or material as supports 80. For example, they may not be inflatable. They may be rigid.

Figure 3:
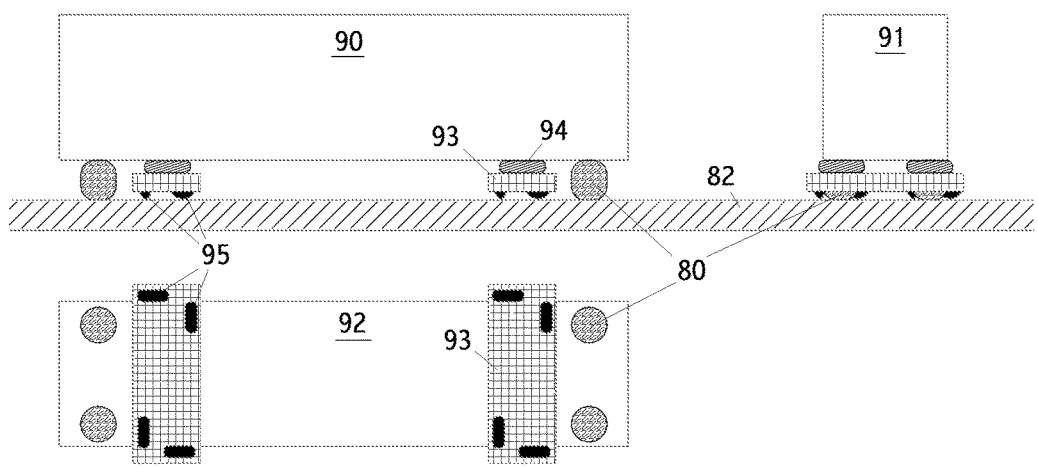
FIG. 3 shows three views of pod on moveable shuttles.

Looking now at FIG. 3, we see three views of a pod: a side view 90, an end view 91, and a bottom view 92. Once the pod is in position it is typically supported by four or more supports, 80. Moving the pod into position and aligning it may be accomplished by the use of two X-Y movable shuttles, 93. One method of moving the shuttles in both an X and Y-axis is to use perpendicular wheels, such as shown 95. A preferred alternative is to use Mechanum wheels. If Mechanum wheels are used, only one shuttle may be necessary to position a pod. The pod may rest on the shuttles 93 via shuttle supports 94, which may be two per shuttle. If adjustable, such shuttle supports permit the pod to be leveled in both the X and Y-axes, as well as to be height aligned with another pod. An alternative method of leveling is to move the pod into X-Y position using the shuttles, then lower the pod onto the adjustable supports 80, then adjust the height of the adjustable supports 80 for such leveling and height. Shuttle supports 94 are not strictly necessary as supports 80 may be inflated to release the pod from the shuttles 93, then, after the shuttles 93 are removed from under the pod, supports 80 are deflated for proper leveling and height.

Airflow

In one embodiment, airflow starts with outside air entering an HVACPIT pod where it is heated or cooled and humidified or dehumidified as required. From the HVACPIT pod the air passes through a source air duct through a HEPA filter into a hallway pod. From there, clean air passes through a ceiling plenum in the hallway pod for distribution to the spur pods, and optionally to additional hallway pods. Distribution of clean air from the hallway pod to the spur pods is via gasketed connections between the hallway pod ceiling plenum and the spur pod. For holding pods, the clean air enters through the ceiling plenum interface, flowing downward through a vertical distribution plenum, and from there to horizontal plenums in the cage racks. The clean air in the cage rack plenums flows into the animal cages. Dirty air from the animal cages flows into horizontal exhaust plenums in the animal racks back to a vertical plenum and from there through a gasketed connection from the holding pod through to a floor plenum in the hallway pod. From their the dirty air flows out of the hallway pod through an optional filter back to the HVACPIT through a duct, or open to the outside air.

In one embodiment the HVACPIT pods have full duplication of one or more services. For HVAC, both pods may be running at the same time, or only one pod running. Each pod is able to continuously meet all of the HVAC needs of the vivarium. If an HVACPIT pod is out of service, it may be repaired on site or the entire pod replaced by a functioning HVACPIT pod.

It is desirable to have the HEPA filter attached to the hallway pod, either inside or outside the container, so that when the ducting between the HVACPIT pod and the hallway pod is opened for service that the clean supply air in the hallway pod is not compromised.

Note that for the described embodiment above, the hallway ceiling clean air plenum may be the full width or length or both of the hallway pods. Note that for the described embodiment above, the hallway return, or dirty air plenums may be the full width or length or both of the hallway pods. That is, there may effectively be a false floor in the hallway pod.

An advantage of a floor plenum is that the gasketed connections through the sides or ends of the hallway pod may constructed free of a threshold. Such threshold-free doorways permit easier access for personnel, rolling carts, and automated equipment such as robots. Penetrations for the supply and return air, for the ceiling and floor plenums, may be made left and right of doorway openings, for example, rather than above or below the doorway opening. This permits doorway openings to not only be threshold-free but also the maximum height.

Note that is necessary that the supply air always have positive pressure over the return air to assure proper direction of airflow at all locations. It is also necessary to have positive pressure inside the vivarium interior spaces compared to outside air to assure than for any air leaks that no pathogens from the outside enter the vivarium. Optional pressure gauges provide feedback to pumps and other equipment in the HVACPIT pods to insure these requirements.

In one embodiment a secondary heater or cooler is used in the supply airflow to maintain a more precise temperature control that is provided by the primary equipment in the HVACPIT pod. Such a secondary heater or cooler may be in the HVACPIT pod, or adjacent to a HEPA filter, or in the hallway pod ceiling plenum or in the supply plenum in the cage-rack pods.

Ideally, all HVAC airflow, pumping, pressurization, and temperature is in the HVACPIT pod or part of the HEPA filter assembly. However, as an example, commercial grade HVAC equipment may maintain air temperature within a 3-degree or a 5-degree band. A secondary heater or chiller may provide clean air within a narrower band, such as within 1 or 0.5 degrees.

In one embodiment only one or more HVACPIT pods provide all active HVAC functions. In this way, the interconnected modular vivarium pods are free of active HVAC equipment. This embodiment minimizes HVAC equipment locations, potential failure points, and chance of either positive or negative feedback or equipment working at cross-purposes.

The following volumes for air may be defined generally as:
Volume A—Clean supply air.
Volume B—Cage air.
Volume C—Dirty return air.
Volume D—Air around electronics and cabling
Volume E—Air inside the vivarium.
Volume F—Outside, atmospheric air.

Ideally, the following relationships hold between these above air volumes.

Volume A clean air originates as the output of HEPA filters, which in turn are supplied by treated air from HVACPIT pods. In one embodiment, this air passes through hallway ceiling plenums, through gasketed sealed openings into vertical plenums in the holding pods, then through horizontal duct bars, then into cages via air supply nipples. Note that as this clean air passes from the horizontal duct bars through the slabs that this path is sealed from the rest of the slab interior, that is, volume D. Ideally, due to positive pressure with respect to all other volumes (B-F) and seals, there is no contamination of volume A air from any other source until this clear air enters the cage.

Volume B air circulates within each separate cage. Air in one cage does not mix with any other air, so long as the cage is in the rack. When the cage is removed from the rack the top of the cage is open, so that air in volume B mixes quickly with volume E air. When a cage is removed the nipple at the now A/E interface has limited or no flow and a pressure differential so that volume A air is not back contaminated by volume E air. When a cage is removed the nipple at the now E/C interfaces has limited or no flow and a pressure differential so that volume C air is not back mixed into volume E air. In some embodiments the A/B and the B/C nipple may close partially or fully when the cage is removed from the rack.

Volume C air is dirty, return air from the cages. This air path is from the cage interiors, volume B, through the B/C nipple, into the C channel of the horizontal duct bars. Note that as this dirty air passes into the horizontal duct bars through the slabs that this path is sealed from the rest of the slab interior, that is, volume D.

The interior space of the slab, volume D, includes air around processors, LEDs, cameras, optics, optical and radio communication links, audio input and output, sensors and other electronics and wiring within the slab. This volume is connected through an opening into the central, or wiring, channel of the horizontal duct bars. This volume D air is isolated from volume A, B, and C air. Note that the slab may have sensors in both the supply air volume A and the return air volume C. The sensors or electrical connections to these sensors use sealed penetrations into nipples from A to B or from B to C, or sealed penetrations directly into the horizontal duct channels A or C, or into cage interior B. Thus, such sensors do not alter the air isolations as described. Visual sensors and lights may pass through from the slab interior D into the cage interior B in either direction without altering the air isolations as described. All or a portion of the slab or cage may be transparent or translucent for these purposes. In addition, sensors, lights, audio, buttons and other elements within the slab may interface to the interior of the vivarium, volume E, while maintaining air isolation between volumes D and E. In some embodiments the slap interior D is open to the vivarium air, volume E, such that air in volumes D and E intermix.

Volume E comprises the interior air of the vivarium. Vivarium staff and some equipment operate within this air. Some supply air from Volume A may leak or purposefully be provided in to volume E. Some volume E air may lead or be purposefully vented out in to volume C. Volume E air should not mix with atmospheric air, volume F. However, any leaks, as well as ingress and egress cause volume E air to exit into the atmosphere, volume F, due to positive pressure of volume E with respect to volume F. Volume E air exits through Typically the volume D channels of the horizontal duct bars are open at the end of the cage racks for wiring. This is the interface point between volume D and volume E air. Such D and E air may freely intermix at these points. In some embodiments, a small flow of volume A air may be provided into the slab interiors to provide a slow airflow through the volume D volumes to remove any gases from electronics, cabling, and leaks from other sources through the horizontal duct bars into volume E. That is, volume D air may be at a slight positive pressure over volume E air.

Controlled flow from volume A into volume E may provide fresh air for personnel and to maintain volume E at positive pressure with respect to volume F, normal, outside, atmospheric air.

In one embodiment horizontal ducts A, D and C may, in any combination, provide some or all of the support, directly or indirectly, to animal cages. That is, such ducts, in any combination, may be a structural component of cage racks. Such ducts, in any combination, may be partial or the entire mechanical support for "slabs," that is, electronics enclosures, which in turn provide partial or entire mechanical support for cages. In one embodiment, the only mechanical support for slabs are such horizontal ducts. Slabs may be secured to the bottom of the ducts. Such support may be called, "hanging." Support connection may be via screws, rivets, nails, single or multi-part adhesive, hooks, loops, hook and loop fasteners, buttons, snaps, ties, string, cord, rope or cable, permanent or electric magnet, static or electrostatic connection, slides, friction elements, press fit, soldered, braised, welded or melted, 3-D printing, or other fasteners, singly or in any combination. Support may be permanent or removable. Support may alternatively be under, from the side, or from the back of the slabs, in any combination. In one embodiment, the only mechanical support for a cage may is its associated slab. Such support may be called, "hanging." Support may be via any connection method listed above, or another method. Support may alternatively be under, from the side, or from the back of the cages, in any combination. Ideally, cages slide in and out via passive slides, held in place by friction, gravity, detents, magnets or other simple and passive mechanism. However, arbitrarily more complex methods and mechanisms may be used to secure cages within a cage rack location.

In one embodiment duct channels for volumes A, C and D, as described above, may be combined, in any combination, into a monolithic duct bar. In one embodiment all three volumes are combined into a single duct bar. In one embodiment, the duct bar is extruded, monolithic, PVC. Exemplary cross sectional dimensions for the ducts are 2"×4" for ducts A and C; and 2"×3" for duct D. Such dimensions may vary by plus or minus, in any dimension, by ⅛", ¼ ", 1/1", 1", 1.5", 2", 2.5", 3", 4", 5" or 6", in any combination. All such combinations are explicitly claimed.

A duct bar refers to any unit, module or length of ducting, which may comprise one or more interior channels. In one embodiment, duct bars used as structural elements for animal racks may be in any length from 1 foot to 60 feet.

In one embodiment of cage racks, the rack comprises one or more "rack stands." A rack stand may be secured permanently or temporarily to the inside floor of a holding pod, using any of the above connection methods. A rack stand may simply rest on the floor, or may be on slides or wheels. A rack stand may be secured permanently or temporarily to the inside wall of a cage-rack pod, using any of the above connection methods. A rack stand may not be attached to the wall at all, or may touch, lean or rest against the wall. A rack stand comprises one or more holes or slots through which duct bars are placed. The rack stand(s) supports the weight of the duct bar(s) and any elements the duct bar in turn is supporting. A rack stand may be primarily in the form of sheet. In one embodiment, there is one rack stand between each column of cage locations. In one embodiment there is one hole in each rack stand for horizontal duct bar. In one embodiment there is one horizontal duct bar for each row or cage locations.

For example, for a cage rack in a 40' pod consisting of seven rows and 40 columns of cage locations, 39-41 rack stands may be used, each rack stand comprising seven holes, each hole being penetrated by and supporting one duct bar. A total of seven duct bars are used, each duct bar supporting up to 40 slabs and cages. Some embodiments use fewer rack stands. A 53' pod holds proportionally more. Note that 53' containers are 9' 6" compared to 8' 6" high for a standard 40'. Thus, they support more rows as well as more columns. A high-cube 40' is also 9' 6" high.

An exemplary holding pod might comprise two such exemplary cage racks, one along each long wall.

Suitable numbers of rows are 4 to 40. Suitable numbers of columns are 4 to 300. However, typically the number of rows and columns in maximized subject to the size of the cages and the size of the available space for a cage rack.

Figure 4:
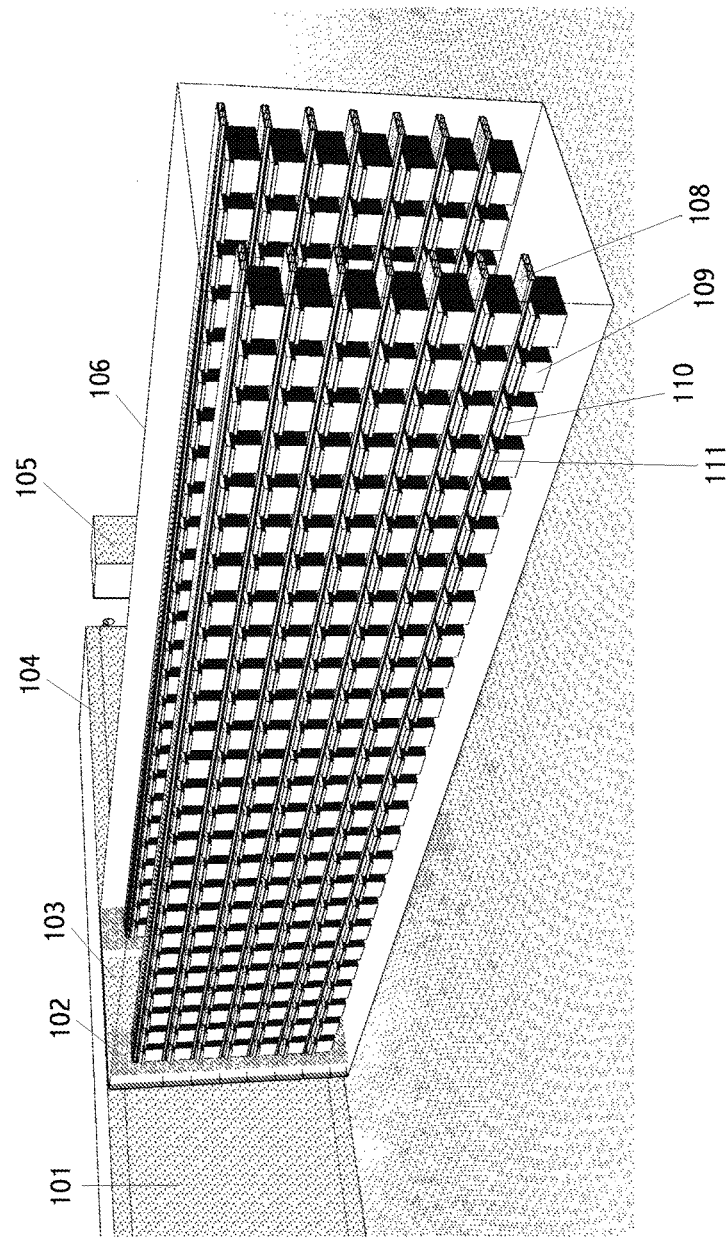
FIG. 4 shows a view of cage racks in a cage-rack pod.
Figure 5:
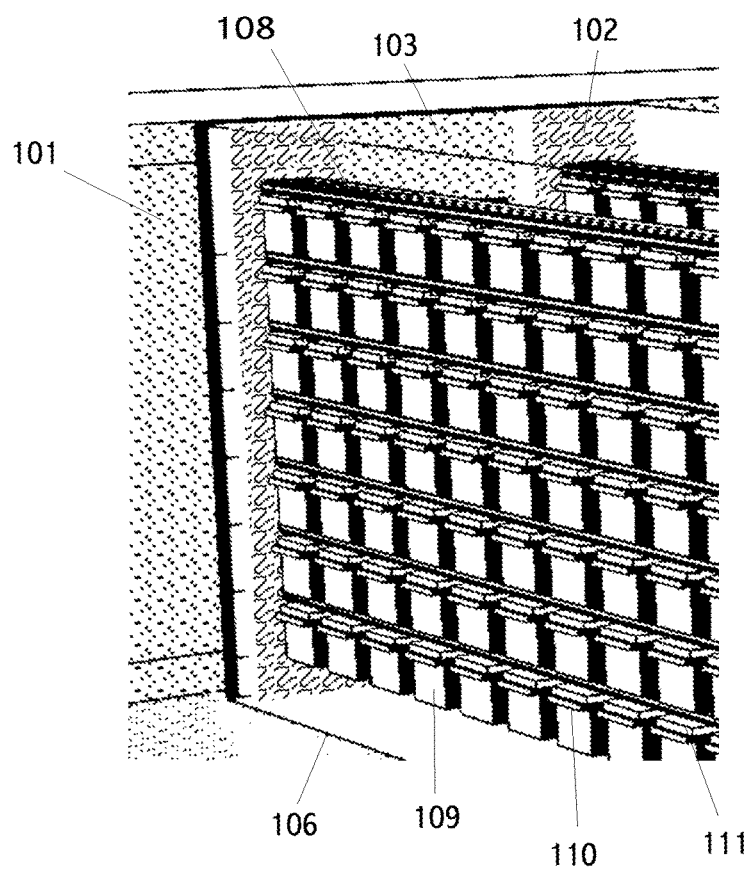
FIG. 5 shows an enlarged view of portions of two cage racks.

In FIGS. 4 and 5 we see one embodiment of a cage-rack pod 106 comprising two, two-dimensional cage racks running the length or nearly the length, such as at least 90% or at least 95% the length of the pod, proximal to each long wall of the cage-rack pod. There is a single isle between the two cage racks such that a robot moving along a single linear path may access any cage in any rack, retrieve that cage and deliver it to the single cage-rack pod doorway. It may also place or return cages their home or to any other cage location within a cage rack. Here we see cages in 7 rows, although other numbers of rows may be used.

Regarding FIGS. 4 and 5, numeric designators apply to both Figures. 101 is a portion of a long wall of a hallway pod. 102 shows one of two dual vertical plenums, where each vertical plenum provides both supply and return air for cage racks proximal to one wall of the cage-rack pod. 103 show the location of the doorway between the hallway pod and the cage-rack pod; the doorway itself and the sterile seals are not shown. 104 show the location of a ceiling plenum in the hallway pod. 105 shows an HVAC or IT pod. 106 shows the outline of the cage-rack pod, such as an outline of a container. 108 shown a cross-section view of a triple channel duct, where such duct supports its row of cages and provides supply airflow and port, return airflow and port and a cable duct for each cage. 109 shows the front of a one animal cage. 110 show the pull handle for one animal cage. 111 shows the electronics "slab" above each cage.

Note that a novelty of this vivarium is that all necessary components of the vivarium are either transportable pods or are in transportable pods. Because of the complete, rather than partial, modularity, all pods may be sized, pre-made and pre-configured for optimal compatibility with the other pods and an assembled modular vivarium constructed of such pods. For example, a single hallway, maximally configured with spur pods and ingress/egress, supply/waste pods represents the maximum load that one HVAC pod and one IT pod may service. If the vivarium is then expanded by adding a second hallway pod, then the new maximum configuration may be serviced by adding one more HVAC pod and IT pod or optionally one more HVACPIT pod.

Note that any necessary power for the vivarium may be provided by an HVAC pod (actually an HVACP pod, then) or by an IT pod (actually a PIT pod, then), or by an HVACPIT pod. "Power" typically means UPS power (Uninterruptable Power Supply) for standard electrical needs and also any low-voltage or specialized power that might be needed, also configured via a UPS.

Additional Embodiments

Embodiments and combinations below show additional features and limitations that are claimed, in any combination, in conjunction with other embodiments, claims, limitations, features and drawings.

Embodiments wherein the cage-rack pods have a single doorway; embodiments wherein a single doorway connects a cage-rack pod to a hallway pod when the pods area connected.

Embodiments wherein doorways are free of doors. In particular, embodiments wherein the cage-rack pod is free of a door.

Embodiments wherein at least one door used to seal for sterility a pod during transport is not hinged. Embodiments wherein all doorways in cage-rack pods are free of an operable door.

Embodiments wherein at least one door used to seal for sterility a pod during transport is a single use seal, not a re-usable door.

Embodiments wherein at least one door in a doorway between pods, when closed, is flush with the wall of the pod.

Embodiments wherein all doors in doorways between pods, when closed, are flush with the wall of the pod.

Embodiments where a sterile seal for a doorway is free of a door.

Embodiments wherein in a cage-rack pod two cage racks extend continuously for at least 90% or at least 95% of the length of the pod, measured using the interior side of exterior walls.

Embodiments wherein a cage-rack pod is free of walls to partition the pod into interior portions of which function is other than holding and servicing cages.

Embodiments wherein an HVAC pod interior air is not sterile except for air in ducts for the purpose of moving sterile air.

Embodiments wherein HVAC services for the modular vivarium are provided external to the pod cluster.

Embodiments wherein IT services for the modular vivarium other than switches and associated power supplies are provided external to the pod cluster.

Embodiments wherein all cage racks in a cage-rack pod are parallel with and proximal to a long wall of the cage-rack pod.

Embodiments wherein a cage-rack pod comprises exactly one isle between cage racks.

Embodiments wherein the only source of sterile supply air for a cage-rack pod is from a hallway pod via disconnectable ducting.

Embodiments wherein the only outlet for air from animal cages in a cage-rack pod is to a hallway pod via disconnectable ducting.

Embodiments wherein the airtight junctions provide earthquake motion isolation between the pods it connects up to a predetermined relative motion distance; wherein the airtight junctions provide rigid mechanical connectivity between the pods it connects for relative motion beyond predetermined distance such that the airtight seal of the airtight junction is not broken during such motion.

Embodiments wherein the modular vivarium cluster further comprises a mobile workstation in a first hallway pod wherein the mobile workstation may be placed in the junction between a first cage-holding pod and the first hallway pod and wherein the mobile workstation, when so placed, creates a workstation air seal between the first cage-holding pod and an interior volume of the mobile workstation such that air flows from the first cage-holding pad into the interior volume of the mobile workstation; wherein air flows from the first hallway pod into the interior volume of the mobile workstation; and wherein air exits the interior volume of the mobile workstation through a mobile workstation air exit plenum.

Embodiments wherein the modular vivarium cluster provides the following services within the cluster: vivarium animal holding cages; vivarium animal air supply and exhaust; vivarium temperature regulation; vivarium animal procedure stations; automated vivarium animal cage transport; vivarium data sensors, data collection, and data switching;

Embodiments wherein pods are manufactured from standard shipping containers.

Embodiments wherein the HVACPIT pods provide at least one of the services to the cluster from the list of: {vivarium air supply; regulated power; IT services}.

Embodiments wherein interconnecting proximal doorways on the cage-holding pods and the hallway pod; and interconnecting proximal doorways on the one or more HVACPIT pods with the hallway pod such that air inside the cage-holding pods, the air in the hallway pod, and the air inside the at least one HVACPIT pod remains sterile, such that after interconnection people may move through the interconnected doorways between interconnected pods.

Embodiments wherein a method of assembling a modular vivarium comprising the additional step of: leveling each of the plurality of cage-holding pods with one or more adjustable pod supports after the each pod is placed and prior to an unsealing step.

Embodiments wherein a method of assembling a modular vivarium comprising the additional step of: moving each of the plurality of cage-holding pods into their each placing position by two movable shuttles, the two shuttles supporting the weight of the each cage-holding pod, the movable shuttles being movable in two orthogonal axes.

Embodiments wherein a method of assembling a modular vivarium wherein: the two movable shuttles are powered for movement in the two orthogonal axes.

Definitions

"Dynamic"—Means may be performed without interrupting the operation of an operating vivarium in the cluster.

"HVAC"—Means "heating, ventilation and air-conditioning."

"HVACPIT"—Means any combination of HVAC, power supply, and IT services, in various combinations, ideally with redundancy of all such services. HVAC pods and IT pods may be separate pods or may be combined into one HVACPIT pod.

"IT"—Means "information technology," such as industry standard switches, routers, servers, ISP connections, and the like.

"IT pod"—Means a pod that provides IT services to the vivarium.

"Shipping container"—Means an ISO Standard intermodal shipping container, including but not limited to ISO 668:2013 Series 1 and ISO 1496-1:2013 specifications, and later ISO specification that supplement or supplant these. Sizes included the scope of "shipping container" include 20' container, 40' container, 40' high-cube container, 45' high cube container, 48' container, 53' container and 60' container. Also included are nearest metric standard containers to the prior list. Also included are standard military containers, some of which comply with ISO 668 1D, 1E, and 1F Standards. A preferred embodiment uses 40' high-cube and 53' containers, in any combination.

"Sterile interior air"—Means pathogen-free interior air, in the context and meaning in the operation and art of operating vivariums.

"Pathogen-free"—Means the population of microbes, including but not limited to bacteria, viruses, prions and toxins, relevant to an experiment, test or study ("study"), is sufficiently reduced to meet the needs of the study, or to impact or alter study results, or to alter the credibility or repeatability of study results, for studies using the vivarium, and to not impact the health, performance or behavior of the target animal population in the vivarium or of the workers.

"Subset"—May include any non-zero number of elements from a set, including all elements from the set.

"SWITCH"—Means the normal IT definition of "switch," e.g., layer 2 IP frame forwarding. A switch may provide additional functions, including routing, security, redundancy, and other such functions available to IT industry "switch" components.

"T-formation"—Means nominally at right angles, although other angles might be used, such as for an italic "T."

"Two-dimensional" or "2D"—With respect to cage racks refers to cages or cage racks in an X-Y grid, such as each of the two cage-racks in FIGS. 4 and 5.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention.

Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims, including amended or continuation claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

I claim:

1. A modular vivarium comprising a cluster of pods comprising:
   one or more transportable cage-rack pods, each comprising one or more permanent doorways;
   one or more transportable hallway pods, each comprising two or more permanent doorways;
   wherein a first cage-rack pod is removably joined to a first hallway pod such that a first permanent doorway on the first cage-rack pod is mated to a first permanent doorway on the first hallway pod via a first sterile pod junction;
   wherein the one or more cage-rack pods and the one or more hallway pods comprise respective interior volumes; wherein the respective interior volumes are sterile;
   wherein the first sterile pod junction permits airflow between the interior of the first cage-rack pod and the interior of the first hallway pod and wherein the sterile pod junction does not permit airflow between the interior volume of either pod connected via the sterile pod junction and air outside the cluster of pods;
   wherein the cluster is dynamically expandable by removably joining a second cage-rack pod to the cluster or by removably joining a second hallway pod to the cluster or by removably joining both a second cage-rack pod and a second hallway pod to the cluster; wherein such joining mates permanent doorways on the respective pods and such joining is via at least a second sterile pod junction;
   wherein the first doorway of the cage-rack pod and the first doorway of the first hallway pod are closed during transport of the respective pods and open when the respective pods are removably joined via the first sterile pod junction;
   wherein the first doorways of the cage-rack pod and hallway pod, and the sterile pod junction, are adapted so that when the respective pods are joined, a pre-existing sterility of the interior volumes of the respective pods is maintained.

2. The modular vivarium of claim 1 wherein:
the width of the one or more transportable cage-rack pods is no greater than eight feet six inches.

3. The modular vivarium of claim 1 wherein:
the width of the one or more transportable hallway-rack pods is no greater than eight feet six inches.

4. The modular vivarium of claim 1 wherein:
the first transportable cage-rack pod comprises an automated mechanism adapted to retrieve a selected cage from a cage rack inside the first cage-rack pod and deliver it to the first doorway of the first cage-rack pod while no person is inside the first cage-rack pod.

5. The modular vivarium of claim 1 wherein:
the cluster is dynamically expandable by removably joining an ingress pod by mating a first permanent doorway on the ingress pod to a second permanent doorway in a pod in the cluster via at least a third sterile pod junction; and
wherein the ingress pod comprises a second permanent doorway on the ingress pod; and
wherein the ingress pod is adapted for personnel to enter the ingress pod via its second permanent doorway and exit the ingress pod via its first permanent doorway.

6. The modular vivarium of claim 1 wherein:
the cluster is dynamically expandable by removably joining a first transportable HVAC pod;
wherein the first transportable HVAC pod provides sterile air to the cluster;
and wherein the first transportable HVAC pod is no wider than eight feet six inches.

7. The modular vivarium of claim 6 wherein:
the cluster is dynamically expandable by removably joining a second transportable HVAC pod;
wherein the second transportable HVAC pod provides sterile air to the cluster; and
wherein the first and second transportable HVAC pods are adapted to operate redundantly such that a failure of either HVAC pod does not cause the cluster to lack sufficient sterile air for vivarium operation.

8. The modular vivarium of claim 1 wherein:
the cluster is dynamically expandable by removably joining a first transportable IT pod; wherein the first transportable IT pod provides IT services to the cluster; and
wherein the first transportable IT pod is no wider than eight feet six inches.

9. The modular vivarium of claim 8 wherein:
the cluster is dynamically expandable by removably joining a second transportable IT pod;
wherein the second transportable IT pod provides IT services to the cluster;
and
wherein the first and second transportable IT pods are adapted to operate redundantly such that a failure of either IT pod does not cause the cluster to lack sufficient IT services for vivarium operation.

10. The modular vivarium of claim 1 wherein:
the first transportable cage-rack pod further comprises:
a two-dimensional array of animal cage racks;
wherein the two-dimensional array of animal cage racks comprises:
   a first duct adapted to provide fresh air to each cage placed in the cage rack;

a second duct adapted to exhaust used air from each cage place in the cage rack; and a first plenum adapted to carry a communication cable to each cage location in the cage rack.

11. The modular vivarium of claim 1 wherein:

the first transportable cage-rack pod further comprises:

a first two-dimensional array of animal cage racks located on a first wall of the first transportable cage-rack pod;

a second two-dimensional array of animal cage racks located on a second wall of the first transportable cage-rack pod;

the first transportable cage-rack pod comprises an automated mechanism adapted to retrieve a selected cage from a cage rack inside the cage-rack pod and deliver it to the first doorway of the cage-rack pod while no person is inside the first cage-rack pod; and the width of the first transportable cage-rack pod is no greater than eight feet six inches.

12. The modular vivarium of claim 1 wherein the cluster comprise:

two or more transportable cage-rack pods;

one or more transportable hallway pods;

one or more transportable ingress pods;

one or more transportable egress pods;

two or more transportable HVAC pods, adapted to operate redundantly;

two or more transportable IT pods; adapted to operate redundantly;

wherein the transportable HVAC pods may be the same pods as the transportable IT pods;

wherein the transportable pods are no wider than eight feet six inches.

13. The modular vivarium of claim 1 wherein:

the first sterile pod junction is adapted to provide vibration isolation between two pods removably joined by the first sterile pod junction.

14. The modular vivarium of claim 1 wherein:

the first sterile pod junction is adapted to provide earthquake motion isolation between two pods removably joined by the first sterile pod junction, up to a predetermined limit of motion, such that earthquake motion up to the predetermined limit of motion does not break the sterile air seal provided by the first sterile pod junction.

15. A modular vivarium comprising a cluster of pods comprising:

a first transportable hallway pod;

two or more transportable cage-rack pods, each removably connected to a side of the first hallway pod and extending outwards from the first hallway pod;

wherein each cage-rack pod and the first hallway pod comprise respective interior volumes; wherein the respective interior volumes are sterile;

one or more transportable service pods adapted to provide a first subset of such services from the set: {fresh, temperature controlled air; power; information technology};

at least one airtight pod junction wherein the airtight pod junction is adapted to permit airflow between a first pod interior air volume and a second pod interior air volume wherein the airtight pod junction joins the first and second pods and the airtight pod junction does not permit airflow between the first and second pod interior air volumes and air outside the pod cluster;

wherein the cluster further comprises a first worker access pod removably connected to the first hallway pod via a second airtight pod junction;

wherein the cluster is then dynamically expandable by adding additional cage-rack pods up to a predetermined maximum number of removably attached pods to the hallway pod;

wherein the modular vivarium is free of permanent buildings.

16. The modular vivarium of claim 15 wherein:

all transportable hallway pods in the cluster, and all pods in the cluster connected to a transportable hallway pod via an airtight pod junction, are constructed from ISO intermodal containers.

17. The modular vivarium of claim 15 wherein the cluster of pods further comprises:

the first worker access pod is removably connected to the cluster at a first end of the first hallway pod via an airtight pod junction in a perpendicular "T" formation; and wherein the first worker access pod comprises an access door at each end of the first worker access pod and each access door provides a door between the interior of the first worker access pod and outside the cluster of pods.

18. The modular vivarium of claim 17 wherein the cluster of pods further comprises:

a second worker access pod removably connected to the cluster at a second end of a second hallway pod via an airtight pod junction in a "T" formation; and wherein the second worker access pod comprises an access doorway at each end of the second worker access pod and each access doorway provides a doorway between the interior of the second worker access pod and outside the cluster of pods;

wherein the first and second hallway pods may be the same hallway pod and the first and second ends of hallway pods are different ends and the first and second worker access pods are different pods.

19. The modular vivarium of claim 15 wherein:

each airtight pod junction is adapted to permit connection and disconnection of junction pods on each side of the junction such that the previously sterile air in the interior volume of such junction pods remains sterile.

20. The modular vivarium of claim 15 wherein:

a first cage-rack pod comprises two rows of animal cage racks proximal to a common cage access area; and wherein the animal cage racks comprise animal cages;

wherein the first cage-rack pods comprises an automated cage retrieval and placement mechanism adapted to move any desired animal cage, in either animal cage rack, between its associated location in the animal cage rack and the airtight pod junction of the first cage rack pod; such that no person is required to be in the first cage-pod during cage retrieval or placement.

21. The modular vivarium of claim 15 wherein:

the cluster comprises two or more transportable service pods;

the two or more transportable service pods are adapted to operate redundantly;

wherein each transportable service pod is adapted to provide all of the necessary power to operate the modular vivarium.

22. The modular vivarium of claim 15 wherein:

wherein the cluster is dynamically expandable by the addition of one or more additional transportable hallway pods; wherein each additional transportable hallway pod connects to the cluster at the end of an existing hallway pod via an airtight pod junction.

* * * * *